United States Patent
Choi

(10) Patent No.: US 7,773,393 B2
(45) Date of Patent: Aug. 10, 2010

(54) SWITCHING MODE POWER SUPPLY

(75) Inventor: Hang-Seok Choi, Gunpo (KR)

(73) Assignee: Fairchild Korea Semiconductor, Ltd., Bucheon (KR)

( * ) Notice: Subject to any disclaimer, the term of this patent is extended or adjusted under 35 U.S.C. 154(b) by 510 days.

(21) Appl. No.: 11/713,987

(22) Filed: Mar. 5, 2007

(65) Prior Publication Data

US 2007/0217095 A1    Sep. 20, 2007

(30) Foreign Application Priority Data

Mar. 3, 2006    (KR) ..................... 10-2006-0020351

(51) Int. Cl.
*H02M 3/335* (2006.01)
(52) U.S. Cl. ............... 363/21.12; 363/21.16; 363/21.17
(58) Field of Classification Search .................. 361/18; 363/21.01, 21.04, 21.07, 21.12, 21.16–21.18
See application file for complete search history.

(56) References Cited

U.S. PATENT DOCUMENTS

| | | | | |
|---|---|---|---|---|
| 3,999,111 A * | 12/1976 | Bailey | .......................... | 363/27 |
| 4,600,895 A * | 7/1986 | Landsman | ................... | 331/1 A |
| 4,728,816 A * | 3/1988 | Wilke | .......................... | 327/176 |
| 5,237,262 A * | 8/1993 | Ashley et al. | ................ | 323/284 |
| 6,385,060 B1 * | 5/2002 | Basso et al. | .............. | 363/21.15 |
| 6,519,165 B2 * | 2/2003 | Koike | ....................... | 363/21.12 |
| 7,639,516 B2 * | 12/2009 | Usui et al. | ................ | 363/21.12 |
| 2004/0032754 A1 * | 2/2004 | Yang | ........................ | 363/56.09 |
| 2004/0076022 A1 * | 4/2004 | Hong et al. | .............. | 363/21.01 |
| 2006/0028847 A1 * | 2/2006 | Ryu et al. | ................. | 363/21.01 |
| 2006/0158909 A1 * | 7/2006 | Hawley | .................... | 363/21.12 |

\* cited by examiner

*Primary Examiner*—Bao Q Vu
*Assistant Examiner*—Jue Zhang
(74) *Attorney, Agent, or Firm*—Sidley Austin LLP

(57) ABSTRACT

A switching mode power supply includes a power supply circuit, a feedback circuit, and a switching controller. The power supply circuit includes a main switch coupled to a primary coil of a transformer, and supplies power to a secondary coil of the transformer according to an operation of the main switch. The feedback circuit generates a feedback voltage corresponding to an output voltage provided to the secondary coil of the transformer. The switching controller controls the main switch to turn off according to a sense voltage corresponding to the current flowed by the main switch. In this instance, the switching controller quickly senses the output short phenomenon by using the duty ratio of the main switch and the feedback voltage and shuts down the main switch to protect the circuit.

18 Claims, 5 Drawing Sheets

SWITCHING MODE POWER SUPPLY

CROSS-REFERENCE TO RELATED APPLICATION

This application claims priority to and the benefit of Korean Patent Application No. 10-2006-0020351 filed in the Korean Intellectual Property Office on Mar. 3, 2006, the entire contents of which are incorporated herein by reference.

BACKGROUND OF THE INVENTION (a) Field of the Invention

The present invention relates to a switching mode power supply (SMPS) for supplying power by switching of a switch.

(b) Description of the Related Art

An SMPS is a device for converting a DC voltage into a square wave voltage by using a semiconductor device (such as a power MOSFET) as a switch, and then acquiring a DC voltage controlled through a filter. An SMPS is more efficient and durable compared to a conventional linear power supply since it controls power by using a semiconductor device as a switching regulator. In addition, an SMPS is a stabilization power device, having small size and less weight as advantages. An SMPS may be applied to industrial fields, including communication devices, computers, OA devices, and home appliances. In general, an SMPS controls the current (the drain current of a MOSFET) flowing to the main switch of the primary coil and maintains the output voltage of the secondary coil through a turn on/off operation of the main switch of the primary coil according to the current output to the load from the SMPS. In this instance, the SMPS feeds the output voltage back to a capacitor of the primary coil, and controls the duty cycle of the main switch of the primary coil through the feedback voltage charged in the capacitor of the primary coil to thereby maintain the output voltage. That is, the SMPS reduces the feedback voltage charged in the capacitor when the current output to the load is reduced to increase the output voltage, and the SMPS increases the feedback voltage charged in the capacitor when the current output to the load is increased to reduce the output voltage.

FIG. 1 is a diagram illustrating a variation of the sense voltage (Vsense) representing the drain current (Ids) flowing through the main switch of the primary coil when an overload condition occurs in a conventional SMPS. The sense voltage (Vsense) is generated when the drain current (Ids) of the main switch of the primary coil flows through a resistor (Rsense). As shown in FIG. 1, the current flowing through the main switch of the primary coil (as represented by sense voltage (Vsense)) increases when the main switch of the primary coil is turned on because of periodic signals from an oscillator. The main switch of the primary coil is turned off when the sense voltage (Vsense) of the main switch of the primary coil reaches the control voltage (Vc).

The current flows to the load through a diode of the secondary coil when the main switch of the primary coil is turned off. In this instance, the control voltage (Vc) is used to control the level of the sense voltage (Vsense) of the main switch of the primary coil, and it functions to maintain the output voltage (Vo). That is, when the current (Io) output to the load is increased to reduce the output voltage (Vo), the feedback voltage ($V_{FB}$) charged in the capacitor ($C_{FB}$) of the primary coil is increased, the control voltage (Vc) is gradually increased within the threshold voltage range of $Vc^{sat}$ voltage level in correspondence to the feedback voltage ($V_{FB}$) to increase the current (Ids) flowing through the main switch.

Therefore, as shown in FIG. 1, the level of the control voltage (Vc) is maintained when the current (Io) applied to the load is constant from the time 0 to T1 on the time axis. In this instance, when the load is increased at the time T1, the current (Io) increases and the output voltage (Vo) of the secondary coil is reduced, thereby causing an overload condition. The control voltage (Vc) level is increased, and the sense voltage (Vsense) is gradually increased until the time T2. In this instance, the slope of the drain current (Ids) of the main switch of the primary coil and the slope of the current (Id) flowing through the diode of the secondary coil are in proportion to the voltage as expressed in Equation 1.

$$\frac{di}{dt} = \frac{V}{L} \qquad \text{(Equation 1)}$$

Since the input voltage of the primary coil is generally constant, the rising slope of the drain current (Ids) of the main switch of the primary coil is maintained by Equation 1 when the main switch of the primary coil is turned on. When the current (Io) applied to the load is increased, the output voltage (Vo) of the secondary coil is reduced, and the slope of the drain current (Ids) of the main switch of the primary coil is gradually decreased when the main switch of the primary coil is turned off.

Therefore, the main switch of the primary coil is repeatedly turned on/off because of the signal periodically output by the oscillator. As shown in FIG. 1, the rising slope of the sense voltage (Vsense) becomes greater than the falling slope, and the sense voltage (Vsense) is increased corresponding to the control voltage (Vc) after the time T1 each time the main switch of the primary coil is turned on. However, as further shown in FIG. 1, the control voltage (Vc) has the $Vc^{sat}$ voltage as a threshold voltage. Therefore, after the time T2, the main switch of the primary coil is turned off when the voltage (Vsense) is increased to the $Vc^{sat}$ voltage in the case in which an overload condition is generated and the feedback voltage ($V_{FB}$) is increased.

The main switch of the primary coil is shut down when the feedback voltage ($V_{FB}$) is increased to the protection voltage (Vp). The protection voltage (Vp) is a reference voltage for protecting the circuit when an overload is generated. As shown in FIG. 1, when the feedback voltage ($V_{FB}$) is increased to the protection voltage (Vp) at time T3, the main switch of the primary coil is shut down. In this instance, the period from the time T2 (in which the sense voltage (Vsense) is increased to the $Vc^{sat}$ voltage) to the time T3 (in which the main switch of the primary coil is shut down) may be considered a delay time ($T_{delay}$), which is expressed in Equation 2.

$$T_{delay} = \frac{C_{FB} \times (V_P - V_c^{sat})}{I_{delay}} \qquad \text{(Equation 2)}$$

Here, $I_{delay}$ is the current flowing to the capacitor ($C_{FB}$) during the delay time ($T_{delay}$). Accordingly, when an overload condition is generated in the conventional SMPS, the main switch of the primary coil is shut down when the delay time ($T_{delay}$) is passed, and hence, the circuit is protected by terminating the operation of the main switch.

FIG. 2 is a diagram illustrating a variation of the sense voltage (Vsense) for representing the current (Ids) flowing to the main switch of the primary coil when an output short is generated for a conventional SMPS. As shown in FIG. 2, at the time T1, the load is increased, which substantially increases the current (Io) applied to the load. The output voltage (Vo) of the secondary coil becomes 0V to thus generate the output short condition. The falling slope of the sense voltage (Vsense) becomes 0 according to Equation 1 when the main switch of the primary coil is turned off. Therefore, the sense voltage (Vsense) for the drain current (Ids) of the main switch of the primary coil is continuously increased each time the main switch of the primary coil is turned on.

FIG. 3 is a diagram illustrating an extended drawing of the sense voltage (Vsense) when the main switch of the primary coil is turned on for a conventional SMPS. Although not illustrated in FIG. 1 and FIG. 2, in the sense voltage (Vsense) waveform, a leading edge overshoot is generated to instantly generate a peak voltage (PC) when the main switch of the primary coil is turned on. Therefore, during the time Tmin in which the peak voltage (PC) is generated, a leading edge blanking (LEB) process is performed so that an excess voltage is not sensed when the sense voltage (Vsense) exceeds the control voltage (Vc) and the main switch of the primary coil is not turned off. Hence, as shown in FIG. 2, when the sense voltage (Vsense) is greater than the $Vc^{sat}$ voltage, the main switch of the primary coil is turned on during the time Tmin for performing the LEB process and the sense voltage (Vsense) is further increased. Therefore, as to the output short condition, the sense voltage (Vsense) is not decreased when the main switch of the primary coil is turned off, differing from the overload condition.

As a result, when the sense voltage (Vsense) becomes greater than the $Vc^{sat}$ voltage, the sense voltage (Vsense) is consecutively increased during the time Tmin when the main switch is turned on. However, in the prior art, in a manner similar to the overload condition, the main switch of the primary coil is shut down after the output short is generated and the delay time ($T_{delay}$) is passed, but the circuit elements may be damaged because a large overload is applied during the delay time ($T_{delay}$).

The above information disclosed in this Background section is only for enhancement of understanding of the invention and is not an admission that such information is in the prior art that is already known in this country to a person of ordinary skill in the art.

SUMMARY OF THE INVENTION

In one aspect of the present invention, a switching mode power supply includes a power supply circuit including a main switch coupled to a primary coil of a transformer, and supplying power to a secondary coil of the transformer according to an operation of the main switch. A feedback circuit generates a feedback voltage corresponding to an output voltage at the secondary coil of the transformer. A switching controller controls the turn on/off operation of the main switch, the switching controller comparing a first voltage corresponding to a current flowing through the main switch and a first reference voltage corresponding to the feedback voltage. The switching controller turns off the main switch when the feedback voltage is greater than a second reference voltage and the duty ratio of the main switch is less than a reference value In another aspect of the present invention, a switching mode power supply includes a transformer having a primary coil and a secondary coil. A main switch coupled to the primary coil of the transformer is turned on in synchronization with clock signals alternately having a high level and a low level. A feedback circuit generates a feedback voltage corresponding to an output voltage applied to the secondary coil of the transformer. A first logic operator controls the turn off operation of the main switch, the first logic operator having an output terminal coupled to a gate of the main switch. A second logic operator outputs a first signal to the first logic operator, the second logic operator having a first input terminal for receiving the clock signals. A first comparator outputs a second signal, the first comparator having a non-inverting terminal and an inverting terminal for receiving the feedback voltage and the first reference voltage. A third logic operator has input terminals for receiving the second signal, a third signal generated by delaying the clock signal by a first period, and the first signal, and an output terminal coupled to the first logic operator.

DETAILED DESCRIPTION OF THE EMBODIMENTS

Figure 1:
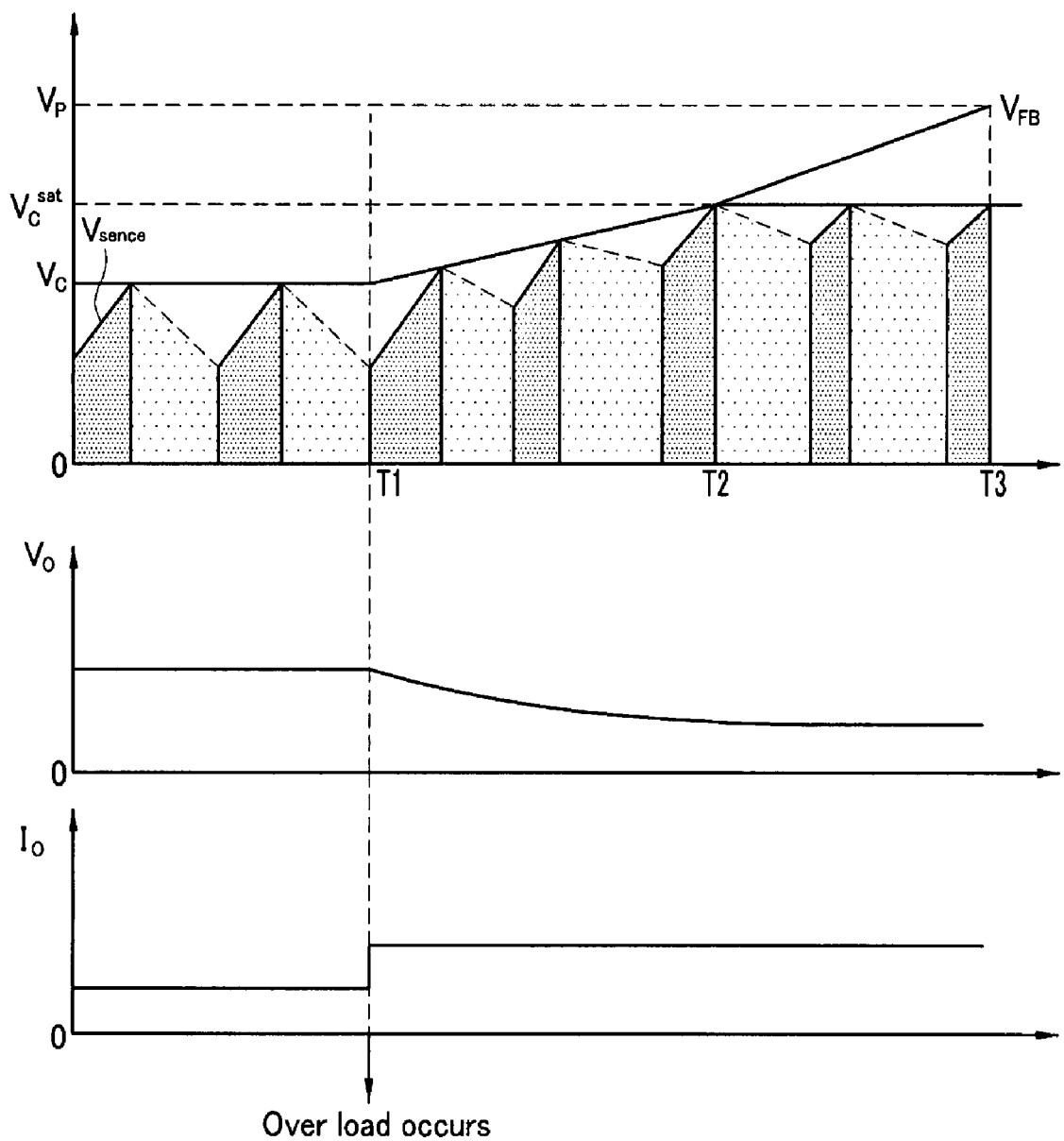
FIG. 1 is a diagram illustrating a variation of a sense voltage for a drain current flowing through the main switch of the primary coil when an overload is generated for a conventional SMPS.
Figure 2:
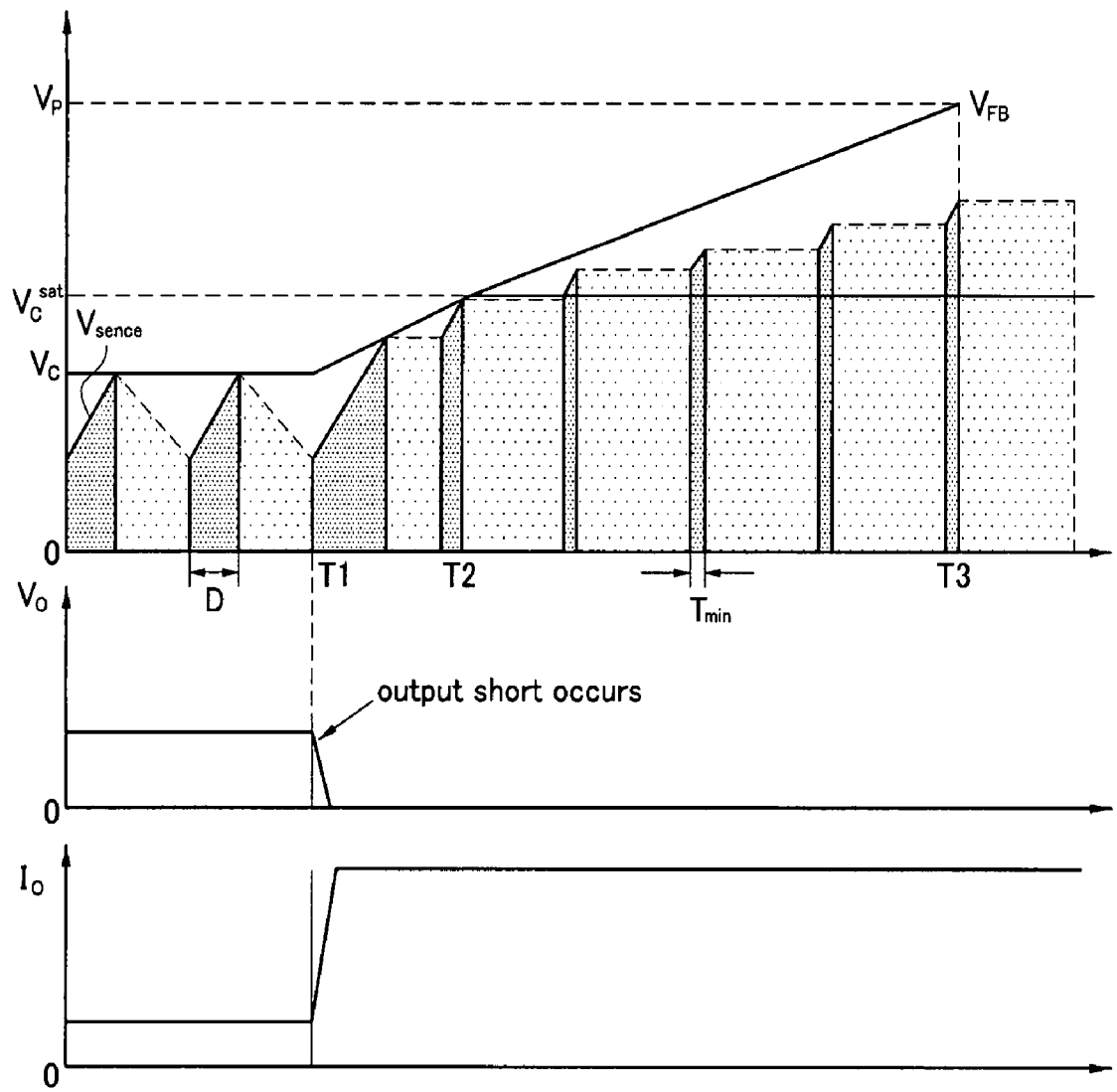
FIG. 2 is a diagram illustrating a variation of a sense voltage for a drain current flowing through the main switch of the primary coil when an output short phenomenon is generated for a conventional SMPS.
Figure 3:
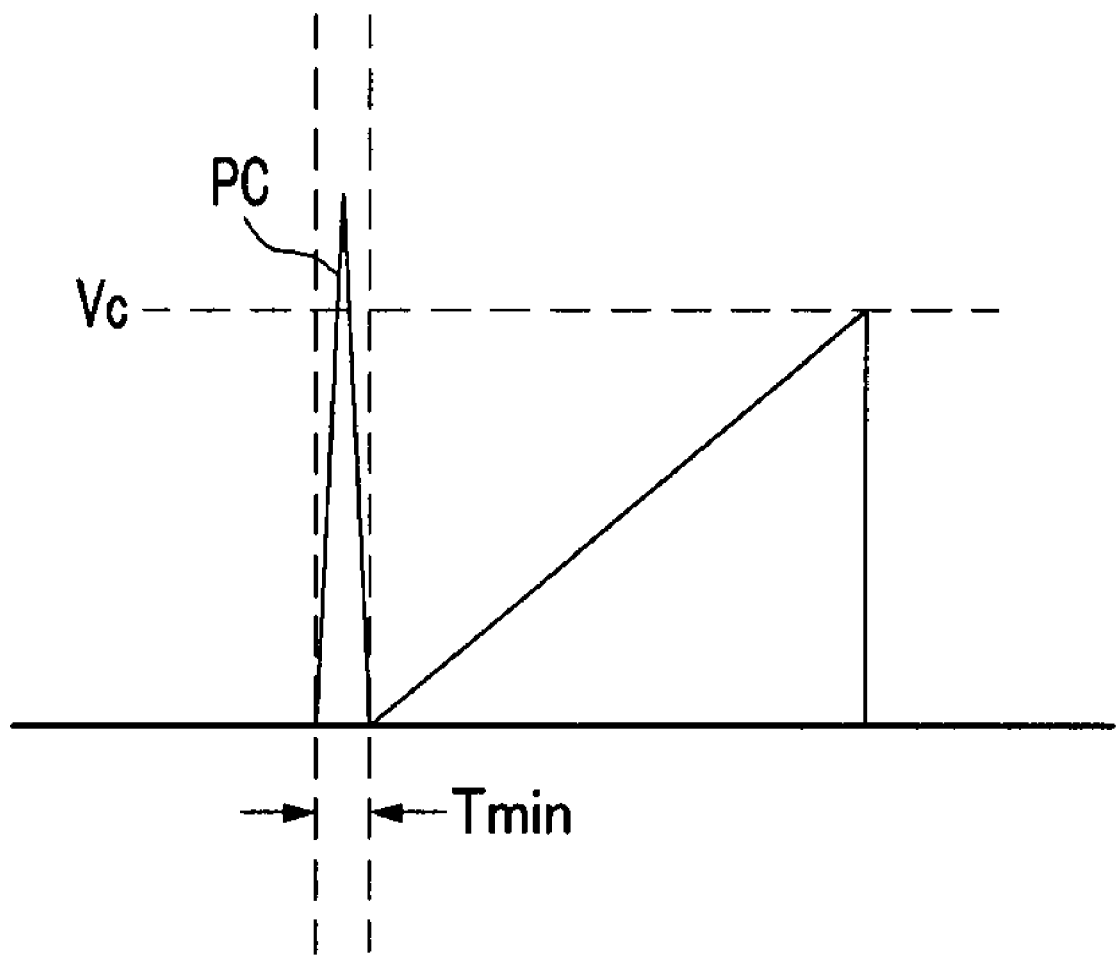
FIG. 3 is a diagram illustrating an extended drawing of the sense voltage when the main switch of the primary coil is turned on for a conventional SMPS.

An exemplary embodiment of the present invention will hereinafter be described in detail with reference to the accompanying drawings. In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. The same parts over the specification have the same reference numerals. An SMPS according to an embodiment of the present invention will now be described in detail with reference to drawings.

Figure 4:
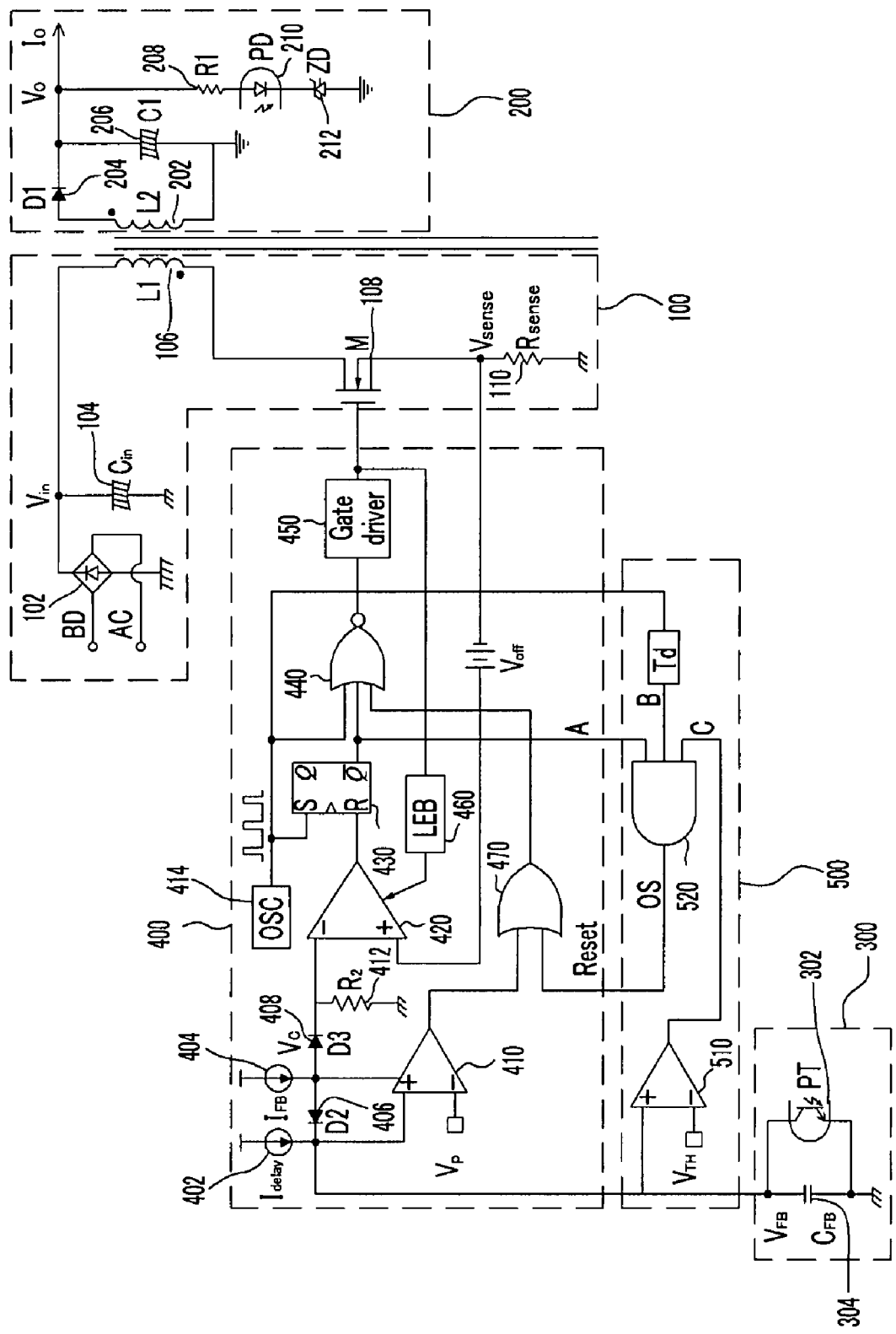
FIG. 4 is a schematic circuit diagram of an exemplary SMPS according to an embodiment of the present invention.

FIG. 4 is a schematic diagram of an exemplary SMPS, according to an embodiment of the present invention. As shown in FIG. 4, the SMPS includes a power supply circuit 100, an output circuit 200, a feedback circuit 300, a switching controller 400, and a protection circuit 500. The power supply circuit 100 includes a full wave bridge rectifier (BD) 102 for rectifying AC input signals, a capacitor (Cin) 104 for smoothing the rectified voltage, a primary coil L1 106 of a transformer coupled to an input voltage (Vin), a switching transistor (M) 108 for functioning as a main switch coupled to the primary coil L1 of the transformer, and a sense resistor (Rsense) 110 coupled between a source of the switching transistor 108 and a ground and sensing the current flowing through the switching transistor 108. In this instance, the main switch of the exemplary SMPS can be implemented as a MOS field effect transistor (MOSFET).

The power supply circuit 100 of the exemplary SMPS receives an input voltage (Vin) and supplies power to the secondary coil 202 of the transformer according to the duty cycle of the switching transistor 108 to output a predetermined output voltage (Vo) to the output circuit 200. In this instance, the output voltage (Vo) is fed back, and the SMPS uses the feedback value to control the duty cycle of the switching transistor 108 of the supply 100, thereby regulating the output voltage (Vo).

The output circuit 200 of the exemplary SMPS may include a diode D1 204 having an anode coupled to the secondary coil L2 202 of the transformer, a capacitor C1 206 coupled between a cathode of the diode D1 204 and a ground, a resistor R1 208 coupled to the cathode of the diode D1 204, a photodiode (PD) 210 coupled between the resistor R1 208 and the ground, and a Zener diode (ZD) 212 coupled between the photodiode (PD) 210 and the ground. The output circuit 200 outputs an output current (Io) to the load, and provides information corresponding to an output voltage (Vo) to the feedback circuit 300 to regulate the output voltage (Vo). The photodiode (PD) 210 implements a photocoupler together with a photo transistor (PT) 302 of the feedback circuit 300, and provides information corresponding to the output voltage (Vo) to the feedback circuit 300.

The feedback circuit 300 of the exemplary SMPS includes the photo transistor (PT) 302 implementing a photocoupler together with the photodiode (PD) 210 of the output circuit 200, and a capacitor ($C_{FB}$) 304 coupled in parallel to the photo transistor (PT) 302. The photo transistor (PT) 302 works to control the current corresponding to the output voltage (Vo) of the output circuit 200, and the photo transistor (PT) 302 can be equivalently given as a dependent current source. That is, the photo transistor (PT) 302 of the feedback circuit 300 controls the flow of the current corresponding to the output voltage (Vo) of the output circuit 200 so that a relatively large amount of current may flow to the photo transistor (PT) 302 to further reduce the feedback voltage ($V_{FB}$) charged in the capacitor ($C_{FB}$) 304 when the output voltage (Vo) is high, and a relatively small amount of current may flow to the photo transistor (PT) 302 to increase the feedback voltage ($V_{FB}$) charged in the capacitor ($C_{FB}$) 304 when the output voltage (Vo) is low.

Accordingly, the information corresponding to the output voltage (Vo) is sensed by the feedback circuit 300 and is then input to the switching controller 400, and is used to control the duty cycle of the switching transistor (M) 108.

As shown, the switching controller 400 of the exemplary SMPS includes a first current source ($I_{delay}$) 402, a second current source ($I_{FB}$) 404, a first comparator 410, a second comparator 420, an latch 430 (e.g., a set-reset (SR) flip-flop), a NOR gate 440, a gate driver 450, an LEB 460, and an OR gate 470. The capacitor ($C_{FB}$) 304 is coupled to the first current source ($I_{delay}$) 402 for generating a current and the second current source ($I_{FB}$) 404 for generating a relatively greater current compared to that of the first current source ($I_{delay}$) 402. The diode D2 406 has a cathode coupled to the first current source ($I_{delay}$) 402 and an anode coupled to the second current source ($I_{FB}$) 404 to prevent the current of the first current source ($I_{delay}$) 402 from flowing to the second current source ($I_{FB}$) 404. The diode D3 408 has an anode coupled to the second current source ($I_{FB}$) 404 and a cathode coupled to an inverting terminal (−) of the second comparator 420, and a resistor R2 412 is coupled between a contact point of the diode D3 408 and the second comparator 420 and the ground.

When the switching transistor (M) 108 is turned on, the capacitor ($C_{FB}$) 304 is charged by the first current source ($I_{delay}$) 402 and the second current source ($I_{FB}$) 404. The control voltage (Vc) corresponding to the value generated by multiplying the current value of the second current source ($I_{FB}$) 404 and the value of the resistor R2 412 is applied to the inverting terminal (−) of the second comparator 420. In this instance, when a large output current (Io) is applied to the load, the second current source ($I_{FB}$) 404 outputs more current so as to compensate for the application of large current, and the control voltage (Vc) is increased within the range of the threshold voltage level, $Vc^{sat}$.

Therefore, when the voltage ($V_{FB}$) charged in the capacitor ($C_{FB}$) 304 is greater than the $Vc^{sat}$ voltage level, the current of the second current source ($I_{FB}$) 404 cannot be applied to the capacitor ($C_{FB}$) 304 because of the diode D2 406, and the current of the first current source ($I_{delay}$) 402 flows to the capacitor ($C_{FB}$) 304.

The first comparator 410 has a non-inverting terminal (+) and an inverting terminal (−). The non-inverting terminal (+) is coupled to the capacitor ($C_{FB}$) 304 for charging the feedback voltage ($V_{FB}$), and the inverting terminal (−) receives the protection voltage (Vp). When the feedback voltage ($V_{FB}$) has a voltage level greater than the voltage (Vp) according to the comparison result of the first comparator 410, a high level signal is output, and the switching transistor (M) 108 is shut down. The second comparator 420 has a non-inverting terminal (+) and an inverting terminal (−). The inverting terminal (−) receives a control voltage (Vc) and the non-inverting terminal (+) receives a sense voltage (Vsense) corresponding to the drain voltage of the switching transistor (M) 108 of the power supply circuit 100.

In this embodiment, the control voltage (Vc) for controlling the sense voltage (Vsense) is increased when the current of the second current source ($I_{FB}$) 404 is increased. That is, as described above, when the current (Io) output to the load is increased to reduce the output voltage (Vo), the control voltage (Vc) level is increased to increase the current flowing through the switching transistor (M) 108. Therefore, when the sense voltage (Vsense) has a voltage level greater than that of the control voltage (Vc) according to the comparison result of the second comparator 420, a high level signal is output and the switching transistor (M) 108 is turned off. In this instance, it is possible to control the sense voltage (Vsense) level by adding an offset power source (Voff) between the non-inverting terminal (+) of the second comparator 420 and the sense resistor (Rsense). A set terminal (S) of the SR flipflop 430 is coupled to an oscillator (OSC), the reset terminal (R) of the SR flipflop 430 is coupled to the second comparator 420, and an inverted output end (/Q) is coupled to input terminals of a NOR gate 440 and an AND gate 520. The SR flipflop 430 outputs an inverting output signal (/Q) to the NOR gate 440 and the AND gate 520 according to the logic of signals input to the set terminal (S) and the reset terminal (R). Table 1 shows a logical operation result according to the inputs of the SR flipflop.

TABLE 1

| INPUTS | | CURRENT STATES | NEXT STATES | |
|---|---|---|---|---|
| S | R | Q(t) | Q(t + 1) | /Q(t + 1) |
| 0 | 0 | 0 | 0 | 1 |
| 0 | 0 | 1 | 1 | 0 |
| 0 | 1 | 0 | 0 | 1 |
| 0 | 1 | 1 | 0 | 1 |
| 1 | 0 | 0 | 1 | 0 |
| 1 | 0 | 1 | 1 | 0 |
| 1 | 1 | 0 | X | |
| 1 | 1 | 1 | X | |

When the current state is given as the Q(T) in Table 1, the next state is determined depending on the signal input to the reset terminal (R) and the set terminal (S), and the signal level corresponding to a logic value of the /Q(T+1) is output from the output end (/Q).

The above-noted process is not allowed when high level signals are input to both the reset terminal (R) and the set terminal (S). The oscillator (OSC) 414 generates clock signals (CLK) having a predetermined period and outputs them to the NOR gate 440, the AND gate 520, and the SR flipflop 430. The NOR gate 440 receives the clock signals (CLK) from the oscillator (OSC) 414, the inverting output signals (/Q) from the SR flipflop 430, and the signals from the OR gate 470 through the first, second, and third input terminals, and transmits signals generated by a NOR logic operation to the gate driver 450 of the switching transistor (M) 108 to thus control turning on/off the switching transistor (M). The NOR operation outputs a high level signal when the three input signals have a low level, and outputs a low level signal when one of the three input signals is a high level signal. The gate driver 450 outputs a gate voltage (Vg) for turning on/off the switching transistor (M) 108 according to the signal level output by the NOR gate 440. That is, the gate driver 450 turns on the switching MOS transistor (M) when receiving a high level signal from the NOR gate 440, and it turns off the switching MOS transistor (M) when receiving a low level signal.

An LEB circuit 460 is coupled between a gate of the switching transistor (M) 108 and the second comparator 420. In this instance, the LEB circuit 460 provides an enable signal to the second comparator 420. The LEB circuit 460 prevents the switching transistor (M) 108 from being turned off even though the drain current (Ids) is abruptly increased to be greater than the control voltage (Vc) when the switching transistor (M) 108 is turned on at the falling edge time of the clock signal (CLK). The LEB circuit 460 can be implemented with an RC filter. The OR gate 470 receives signals from the first comparator 410 and the AND gate 520 through the first and second input terminals, and outputs a signal to the NOR gate 440.

The protection circuit 500 of the exemplary SMPS includes a third comparator 510 and an AND gate 520. The third comparator 510 includes a non-inverting terminal (+) and an inverting terminal (−). A reference voltage ($V_{TH}$), which may have a value less than the $Vc^{sat}$ voltage, is coupled to the inverting terminal (−), and the voltage ($V_{FB}$) charged in the capacitor ($C_{FB}$) is coupled to the inverting terminal (+).

Therefore, the feedback voltage ($V_{FB}$) is compared with the reference voltage ($V_{TH}$) to sense the voltage rising of the feedback voltage ($V_{FB}$) before the feedback voltage ($V_{FB}$) rises to the $Vc^{sat}$ voltage. The AND gate 520 receives the signal A output by the inverting output terminal (/Q) of the SR flipflop 430, the signal B generated by time delaying (Td) the clock signal (CLK) of the oscillator (OSC) 414, and the output signal C of the third comparator 510 through the first, second, and third input terminals, and outputs a signal to the OR gate 470. The AND gate 520 outputs a high level signal when the three input signals are high level signals. The high level signal in this case means that the output short (OS) condition is sensed or detected.

Figure 5:
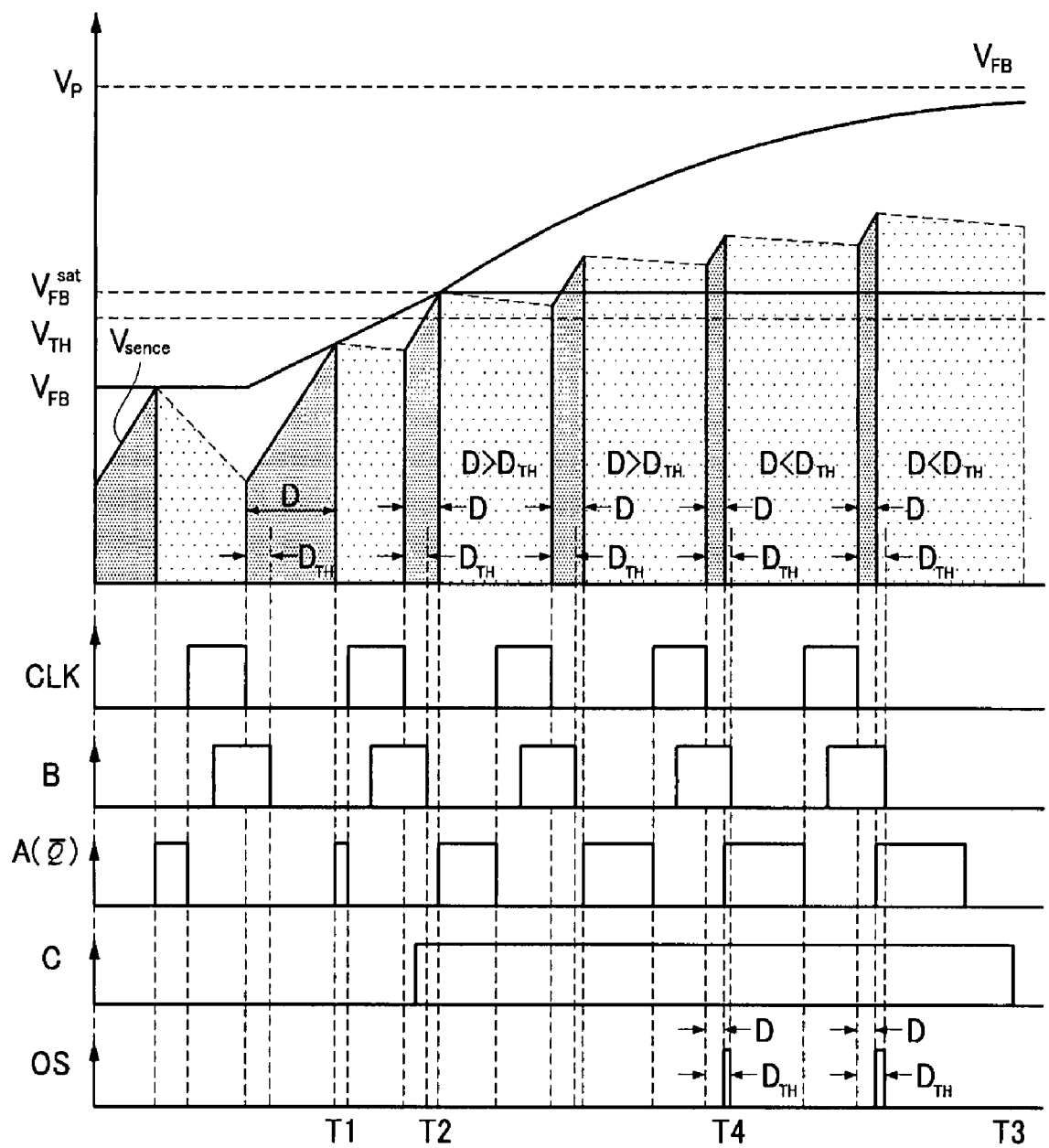
FIG. 5 is a diagram illustrating a method for sensing an output short condition, according to an embodiment of the present invention.

Referring to FIG. 5, an exemplary method for sensing the output short condition, according to an embodiment of the present invention, will now be described. In one embodiment, this method may be performed by the protection circuit 500. FIG. 5 is a graph of a signal input to the AND gate 520 of the exemplary protection circuit 500 when an output short is generated. The oscillator (OSC) 414 generates clock signals (CLK) having a predetermined period, and the switching transistor (M) 108 is turned on when the signal is switched from the high level to the low level. The AND gate 520 receives the clock signals (CLK), time-delayed (Td) by the predetermined period of $D_{TH}$, through the second input terminal of the AND gate 520. The AND gate 520 receives the signals (A) output by the inverting output terminal (/Q) of the flip-flop 430 through the first input terminal of the AND gate 520. That is, the signal A has the opposite phase of the clock signals (CLK) while the switching transistor (M) 108 is turned off. The switching transistor (M) 108 is turned off when the signal A is switched from the low level to the high level.

Therefore, when the sense voltage (Vsense) is increased to the control voltage (Vc) while the switching transistor (M) 108 is turned on, the second comparator 420 senses the increase and outputs a high level signal to the reset terminal (R) of the SR flipflop 430. In this instance, since the oscillator (OSC) 414 outputs a low level signal to the set terminal (S), the SR flipflop 430 outputs a high level signal through the inverting output terminal (/Q).

Therefore, when the sense voltage (Vsense) is increased to the control voltage (Vc), the signal A output through the inverting output terminal (/Q) of the SR flipflop 430 is switched from the low level signal to the high level signal, and the switching transistor (M) 108 is turned off. In this instance, since the oscillator (OSC) 414 turns on the switching transistor (M) 108 with a predetermined period, the duty ratio of the switching transistor (M) is substantially reduced. That is, the switching transistor (M) 108 is turned on during a time interval D from the time when the clock signal (CLK) is switched from the high level to the low level to the time when the signal (A) is switched from the low level to the high level. Therefore, it is determined that the duty ratio of the switching transistor (M) 108 is substantially reduced when the time interval D in which the switching transistor (M) is turned on is less than the period ($D_{TH}$) of time delay (Td).

The AND gate 520 receives the output signal C of the third comparator 510 through the third input terminal of the AND gate 520. Therefore, the third comparator 510 outputs a high level signal when the feedback voltage ($V_{FB}$) has a level greater than that of the reference voltage ($V_{TH}$) because of the increase of current (Io) applied to the load. In this instance, since the AND gate 520 outputs the high level when the input signals are high level, the duty ratio is substantially reduced. When the feedback voltage ($V_{FB}$) has a level greater than that of the reference voltage ($V_{TH}$), the output signal (OS) of the AND gate 520 has a high level as shown in FIG. 5. Since the OR gate 470 outputs a high level signal when at least one of its input signals is high level, the OR gate 470 outputs a high level signal to the NOR gate 440 when receiving a high level signal from the AND gate 520. The NOR gate 440 turns off the switching transistor (M) 108 when at least one high level signal is input. As a result, when the signals input to the AND gate 520 become high level signals, the AND gate 520 outputs a high level signal (OS) to shut down the switching transistor (M) 108.

Therefore, according to an embodiment of the present invention, when the output short condition occurs in the SMPS, the output short is sensed before the delay time ($T_{delay}$) has elapsed, and the main switch of the primary coil 106 is then shut down. That is, as shown in FIG. 5, the switching transistor (M) 108 is shut down at the time T4, before the time T3. Although the present invention and its advantages have been described in detail, it should be understood that various changes, substitutions, and alterations can be made therein without departing from the spirit and scope of the invention as defined by the appended claims. That is, the discussion included in this application is intended to serve as a basic description. It should be understood that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. Neither the description nor the terminology is intended to limit the scope of the claims.

What is claimed is:

1. A switching mode power supply comprising:
   a power supply circuit including a main switch coupled to a primary coil of a transformer, and supplying power to a secondary coil of the transformer according to an operation of the main switch;
   a feedback circuit for generating a feedback voltage corresponding to an output voltage at the secondary coil of the transformer; and
   a switching controller for controlling the turn on/off operation of the main switch, the switching controller comparing a first voltage corresponding to a current flowing through the main switch and a first reference voltage corresponding to the feedback voltage, wherein the switching controller turns off the main switch when the feedback voltage is greater than a second reference voltage and the duty ratio of the main switch is less than a reference value.

2. The switching mode power supply of claim 1, wherein the first voltage is generated by a resistor coupled in series between the main switch and the ground and which receives the current that flows through the main switch.

3. The switching mode power supply of claim 2, wherein the main switch is turned on in synchronization with clock signals alternately having a high level and a low level and is turned off when the first voltage is greater than the first reference voltage.

4. The switching mode power supply of claim 1, wherein the second reference voltage has a voltage level less than a second voltage that is the maximum value of the first reference voltage.

5. The switching mode power supply of claim 4, wherein the switching controller comprises:
   a first constant current source for outputting a first current used for generating the first reference voltage and the feedback voltage; and
   a second constant current source for outputting a second current used for generating the feedback voltage;
   wherein the first current output from the first constant current source is greater than the second current output from the second constant current source.

6. The switching mode power supply of claim 1, wherein the output voltage applied to the secondary coil of the transformer is 0V for a period of time.

7. A switching mode power supply comprising:
   a transformer having a primary coil and a secondary coil;
   a main switch coupled to the primary coil of the transformer and operable to be turned on in synchronization with clock signals alternately having a high level and a low level;
   a feedback circuit for generating a feedback voltage corresponding to an output voltage applied to the secondary coil of the transformer;
   a first logic operator for controlling the turn off operation of the main switch, the first logic operator having an output terminal coupled to a gate of the main switch;
   a second logic operator for outputting a first signal to the first logic operator, the second logic operator having a first input terminal for receiving the clock signals;
   a first comparator for outputting a second signal, the first comparator having a non-inverting terminal and an inverting terminal for receiving the feedback voltage and the first reference voltage; and
   a third logic operator having input terminals for receiving the second signal, a third signal generated by delaying the clock signal by a first period, and the first signal, and an output terminal coupled to the first logic operator.

8. The switching mode power supply of claim 7, further comprising:
   a fourth logic operator having an output terminal coupled to an input terminal of the first logic operator, and an input terminal coupled to the output terminal of the third logic operator; and
   a second comparator having a non-inverting terminal and an inverting terminal for receiving the feedback voltage and a second reference voltage, and an output terminal coupled to the fourth logic operator.

9. The switching mode power supply of claim 8, wherein the third logic operator is an AND gate.

10. The switching mode power supply of claim 9, wherein the first logic operator receives the clock signal, the first signal, and a signal output by the fourth logic operator through the input terminals of the first logic operator.

11. The switching mode power supply of claim 10, wherein the fourth logic operator is an OR gate.

12. The switching mode power supply of claim 11, wherein the first logic operator is a NOR gate.

13. The switching mode power supply of claim 10, wherein the second reference voltage has a magnitude greater than that of the first reference voltage.

14. The switching mode power supply of claim 13, further comprising a third comparator having a non-inverting terminal for receiving a first voltage corresponding to the current flowing through the main switch, an inverting terminal for receiving a third reference voltage corresponding to the feedback voltage, and an output terminal coupled to the second input terminal of the second logic operator.

15. The switching mode power supply of claim 14, wherein the second reference voltage has a magnitude greater than the maximum value of the third reference voltage.

16. The switching mode power supply of claim 7, wherein the second logic operator is an set-reset (SR) flipflop, the first input terminal is a set terminal of the SR flipflop, the second input terminal is a reset terminal of the SR flipflop, and the output terminal of the SR flipflop is an inverting output terminal.

17. The switching mode power supply of claim 7, wherein main switch is turned on at a falling edge of the clock signal.

18. The switching mode power supply of claim 7, wherein the output voltage applied to the secondary coil of the transformer is 0V for a period of time.

* * * * *